(12) United States Patent
Wu et al.

(10) Patent No.: US 8,041,508 B2
(45) Date of Patent: Oct. 18, 2011

(54) NAVIGATION APPARATUS AND METHOD FOR MONITORING VEHICLE SAFETY

(75) Inventors: Shie-Ching Wu, Sanchong (TW); Kuo-Hung Liao, Sanchong (TW); Yu-Ping Yen, Sindian (TW)

(73) Assignee: Altek Corporation, Hsinchu (TW)

( * ) Notice: Subject to any disclaimer, the term of this patent is extended or adjusted under 35 U.S.C. 154(b) by 1022 days.

(21) Appl. No.: 11/976,940

(22) Filed: Oct. 30, 2007

(65) Prior Publication Data

US 2009/0112470 A1 Apr. 30, 2009

(51) Int. Cl.
*B60C 23/02* (2006.01)
*G01M 17/02* (2006.01)
*G06F 19/00* (2006.01)

(52) U.S. Cl. ............. 701/213; 701/2; 701/36; 340/445; 348/231.2

(58) Field of Classification Search .................. 701/213, 701/211, 2, 35, 36, 29; 340/445, 995.1, 426.33, 340/428; 348/231.2; 73/146.3; 702/140
See application file for complete search history.

(56) References Cited

U.S. PATENT DOCUMENTS

| | | | | |
|---|---|---|---|---|
| 5,629,873 | A * | 5/1997 | Mittal et al. | 702/140 |
| 7,423,522 | B2 * | 9/2008 | O'Brien et al. | 340/426.33 |
| 2003/0126920 | A1 * | 7/2003 | Hayashi et al. | 73/146.3 |
| 2006/0001532 | A1 * | 1/2006 | Nagata | 340/438 |
| 2008/0319664 | A1 * | 12/2008 | Kremin et al. | 701/213 |
| 2009/0112389 | A1 * | 4/2009 | Yamamoto et al. | 701/29 |
| 2010/0222963 | A1 * | 9/2010 | Schofield et al. | 701/36 |

* cited by examiner

*Primary Examiner* — Tan Q Nguyen
(74) *Attorney, Agent, or Firm* — Rosenberg, Klein & Lee

(57) ABSTRACT

A navigation apparatus including a central processing unit, an imaging module, a GPS module, a tire pressure monitoring module, and a storage module is provided. The imaging module captures an image signal. The central processing unit controls the imaging module to capture the image signal for generating image data, and further stores the image data in the storage module. The central processing unit executes the electronic map software stored in the storage module and receives the positional data generated by the GPS module for generating route guidance. The central unit receives the digital tire pressure signal received by the tire pressure monitoring module to generate tire pressure data and further identifies whether or not the tire pressure data is in compliance with a safety value.

14 Claims, 7 Drawing Sheets

NAVIGATION APPARATUS AND METHOD FOR MONITORING VEHICLE SAFETY

BACKGROUND OF THE INVENTION

1. Field of the Invention

The present invention relates to a navigation apparatus, and more particularly to a navigation apparatus that concurrently records image data and tire pressure data, and a method for monitoring vehicle safety via the navigation apparatus.

2. Description of Related Art

The Global Positioning System (GPS) is a system that receives satellite signals and analyzes satellite orbiting data to find the location of a satellite, and then computes the positional data including longitude and latitude coordinates, direction, and speed of a receiver via a trigonometric positioning algorithm. Since GPS is a high-precision positioning system which is unaffected by location and time, the GPS service and its related products are widely used. In a variety of different new products, GPS is used as navigation apparatus for obtaining positioning information and providing route guidance.

Referring to FIG. 1 a schematic view of the system architecture of a conventional navigation apparatus 10 is shown. The navigation apparatus 10 includes a GPS module 11, a central processing unit 13, a memory unit 15, and a display interface 17. The GPS module 11 includes an antenna 111 and a signal processing unit 113. The antenna 111 receives a satellite signal and transmits the satellite signal to a signal processing unit 113 for amplifying, filtering and digitizing the signal, and then transmits the digital satellite signal to the central processing unit 13. The memory unit 15 is provided for storing software, receiving data, and processing programs, navigated formula computation programs and electronic maps, wherein the electronic map is a vector map composed of longitude and latitude coordinates. The central processing unit 13 executes the aforementioned software to compute and analyze the satellite signals, unload the electronic map from the memory unit 15, superimpose the received positional data on the map, output the result through the display interface 17, and provide route guidance for the user.

At present, automobile navigation apparatuses are divided into two main models: a model that embeds a GPS module and an electronic map into a motor vehicle and integrates them with a computer and a display device of the motor vehicle, and a second model that affixes a portable navigation apparatus near the driver's seat. Since the price of a motor vehicle increases if the navigation apparatus is built into the motor vehicle and older models of motor vehicles seldom come with navigation functions, the most common method is the second model of affixing a portable navigation apparatus in a motor vehicle to serve as an automobile navigation apparatus.

As we all know, car accidents generally cause tremendous damage the vehicles and injury or death to those involved. Some drivers install a camera at the front side of the motor vehicle to take pictures as the motor vehicle is driving that records images of an accident for evidence. Furthermore, the number of motor vehicles is continuously increasing, and thus driving safety is becoming a more important issue. Since the tire pressure monitoring system (TPMS) that is based upon micro electro-mechanical system (MEMS) technology was introduced, the tire pressure and temperature of a motor vehicle can be monitored. When, as an example, a tire leaks or the pressure of the tire becomes low, an alarm signal will be issued to warn the driver about the condition of the tire, so as to help prevent accidents. Since tire pressure is indispensably related to driving safety the tire pressure monitoring system has gradually become a necessary piece of equipment for all motor vehicles.

Since communication and network technologies are currently developing rapidly, navigation apparatuses further have begun to include communication and network functions to provide diversified services to users. The navigation apparatuses of this sort not only satisfy a user's entertainment requirements, but also bear a hidden risk in that they can distract a driver and lead to car accidents. There is no portable navigation apparatus currently available in the market that integrates the aforementioned image recording and tire pressure monitoring functions. In view of this situation, the inventor of the present invention intends to integrate image recording and tire pressure monitoring functions into a navigation apparatus, so as to enhance the navigation apparatus and improve driving safety.

SUMMARY OF THE INVENTION

It is a primary object of the present invention to provide a navigation apparatus that also has image recording and tire pressure monitoring functions for improving driving safety.

Another object of the present invention is to provide a method for monitoring vehicle safety. The method uses a navigation apparatus to identify whether or not the tire pressure data is in compliance with a safety value so that the driver of the motor vehicle can be notified about the tire condition in a timely manner.

The present invention discloses a navigation apparatus, comprising: a central processing unit, an imaging module, a global positioning system (GPS) module, a tire pressure detecting module, and a storage module. The imaging module captures an image signal. The GPS module generates positional data. The tire pressure monitoring module receives a wireless tire pressure signal to generate a digital tire pressure signal. The storage module stores electronic map software. The central processing unit is coupled to the imaging module, the GPS module, the tire pressure monitoring module, and the storage module. The central processing unit receives an image signal, and then generates and transmits the image data to the storage module for storage. Further, the central processing unit executes the electronic map software and receives positional data for route guidance. The central processing unit processes the digital tire pressure signal into tire pressure data and identifies whether or not the tire pressure data is in compliance with the safety value.

The present invention further discloses a method for monitoring vehicle safety, the method being applicable to motor vehicles with a plurality of tires. The method comprises the steps of: providing the motor vehicle with a navigation apparatus; the navigation apparatus generating positional data as route guidance; connecting the navigation apparatus with a plurality of tire pressure detectors via wireless transmission, the tire pressure detectors being installed on the tires; receiving a wireless tire pressure signal outputted from each tire pressure detector via the navigation apparatus; processing the wireless tire pressure signal into tire pressure data via the navigation apparatus; and identifying whether or not the tire pressure data is in compliance with a safety value via the navigation apparatus for controlling the generation of an alarm signal.

In a preferred embodiment of the present invention, the navigation apparatus includes an image capturer, and the method for monitoring vehicle safety further comprises the steps of: capturing an image signal by the image capturer;

processing the image signal into image data via the navigation apparatus; and transmitting and storing the image data into a storage module via the navigation apparatus.

To make it easier for our examiner to understand the innovative features and technical content, we use preferred embodiments together with the attached drawings for the detailed description of the invention, but it should be pointed out that the attached drawings are provided for reference and description but not for limiting the present invention.

DETAILED DESCRIPTION OF THE PREFERRED EMBODIMENTS

Figure 1:
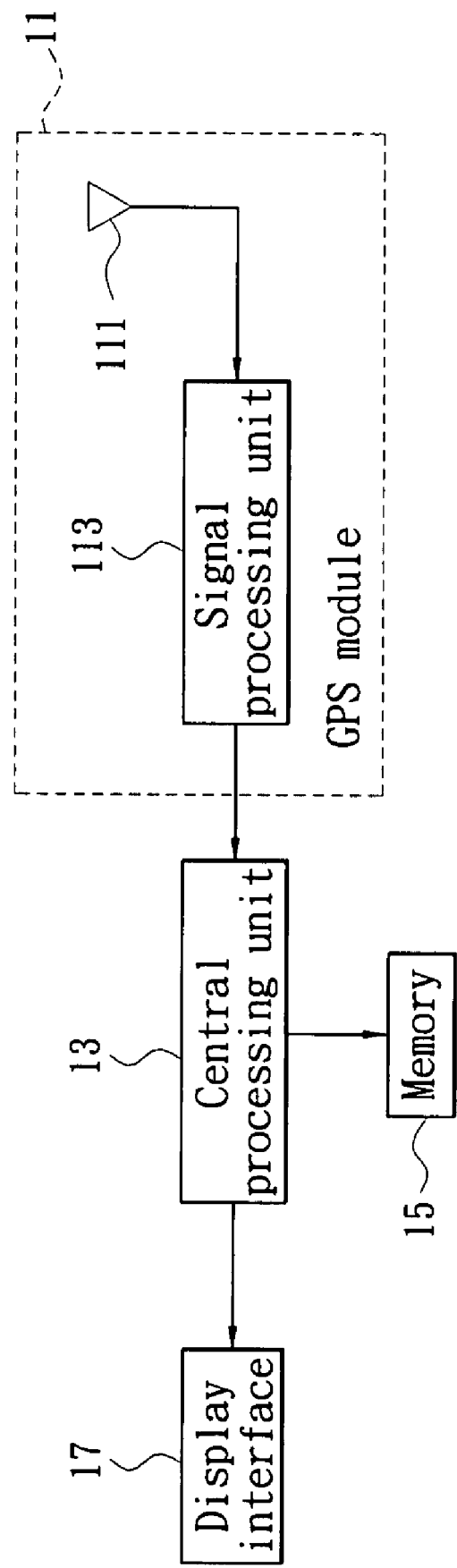
FIG. 1 is a schematic view of the system architecture of a conventional navigation apparatus.
Figure 2A:
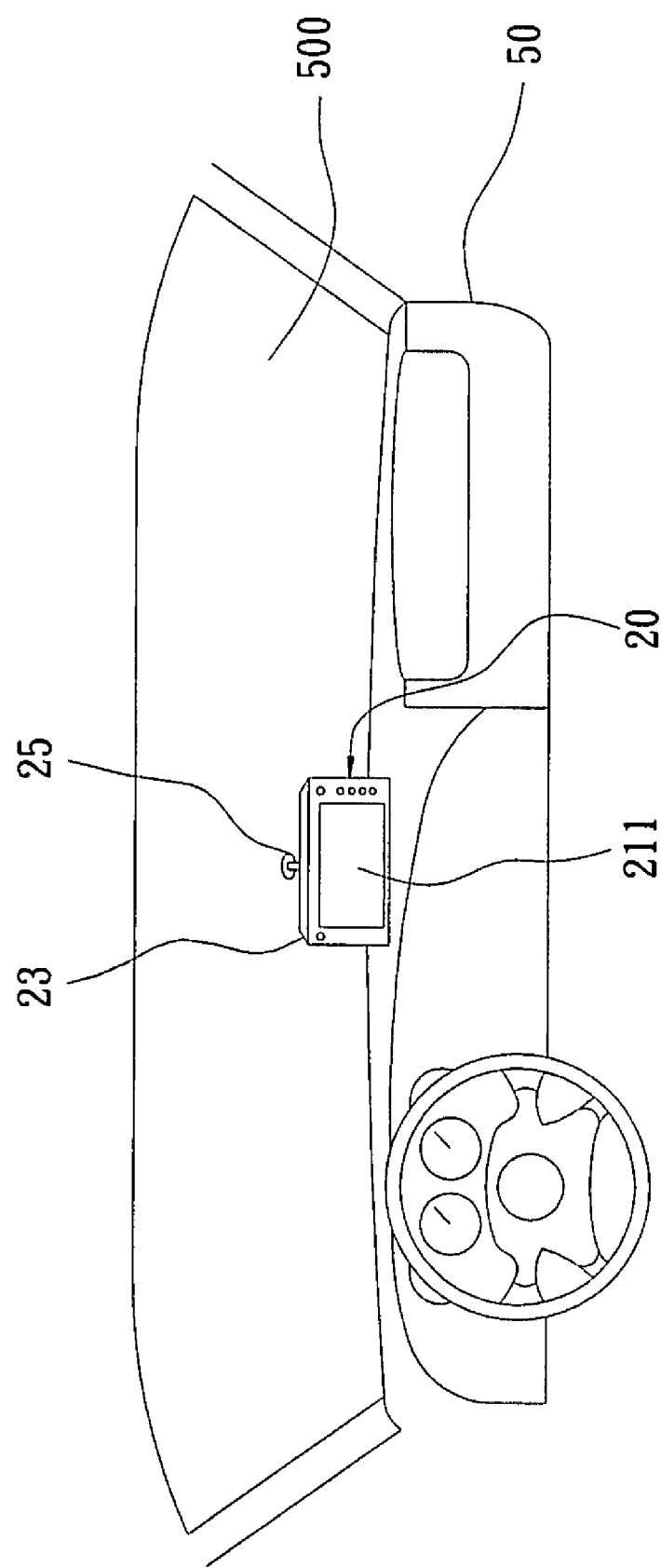
FIGS. 2A and 2B are schematic views of a navigation apparatus in accordance with a preferred embodiment of the present invention.
Figure 2B:
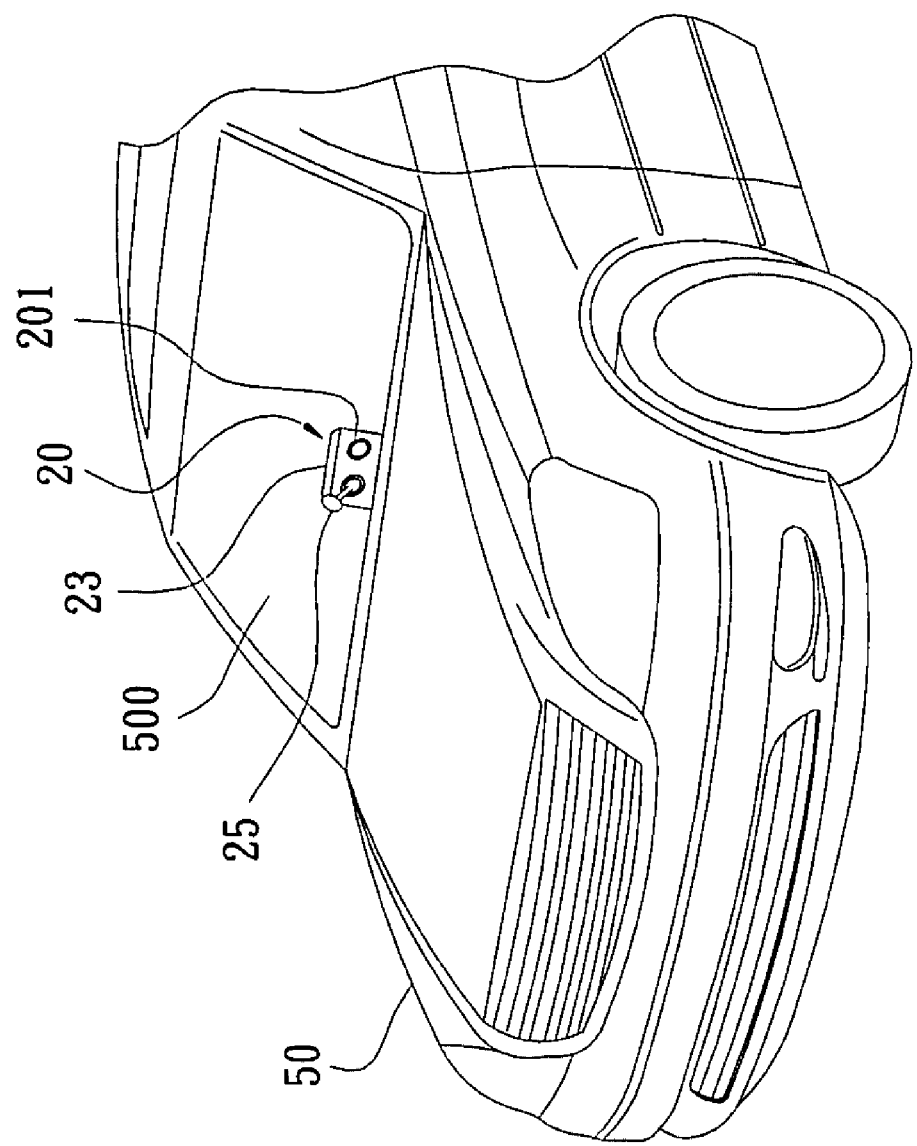

The present invention discloses a navigation apparatus concurrently having the functions of recording images and monitoring tire pressure and a method for monitoring vehicle safety by a navigation apparatus so as to provide improved safety. Referring to FIGS. 2A and 2B for schematic views of a navigation apparatus in accordance with a preferred embodiment of the present invention, the navigation apparatus 20 is a portable navigation apparatus that adopts a global positioning system (GPS) technology for global positioning and route guidance. The navigation apparatus 20 is installed in a motor vehicle 50 for providing route guidance.

In FIGS. 2A and 2B, the navigation apparatus 20 includes a casing 23, a fastener 25 attached onto an internal side of a windshield 500 and connected to the casing 23 for affixing the navigation apparatus 20 onto the internal side of the windshield 500. The navigation apparatus 20 includes a display interface 211 and an image capturer 201. The display interface 211 and the image capturer 201 are installed on two corresponding surfaces of the casing 23 and facing the internal and external sides of the motor vehicle 50 respectively. In general, the display interface 211 is a liquid crystal display panel for outputting images such as an electronic map. The image capturer 201 faces the driving direction of the motor vehicle 50 for continuously capturing image signals in the driving direction of the motor vehicle. The image capturer 201 is a charge coupled device (CCD) or a complementary metal oxide semiconductor (CMOS).

The fastener 25 is provided for affixing the navigation apparatus 20 in the motor vehicle 50. In another preferred embodiment, the fastener 25 is affixed to a base of a meter panel for holding the navigation apparatus 20 such that the display interface 211 and the image capturer 201 are facing the internal and external sides of a windshield 500 respectively. In FIGS. 2A and 2B, the fastener 25 is an attaching member connected to the casing 23, but such an arrangement is not intended to limit the scope of the present invention.

Figure 3:
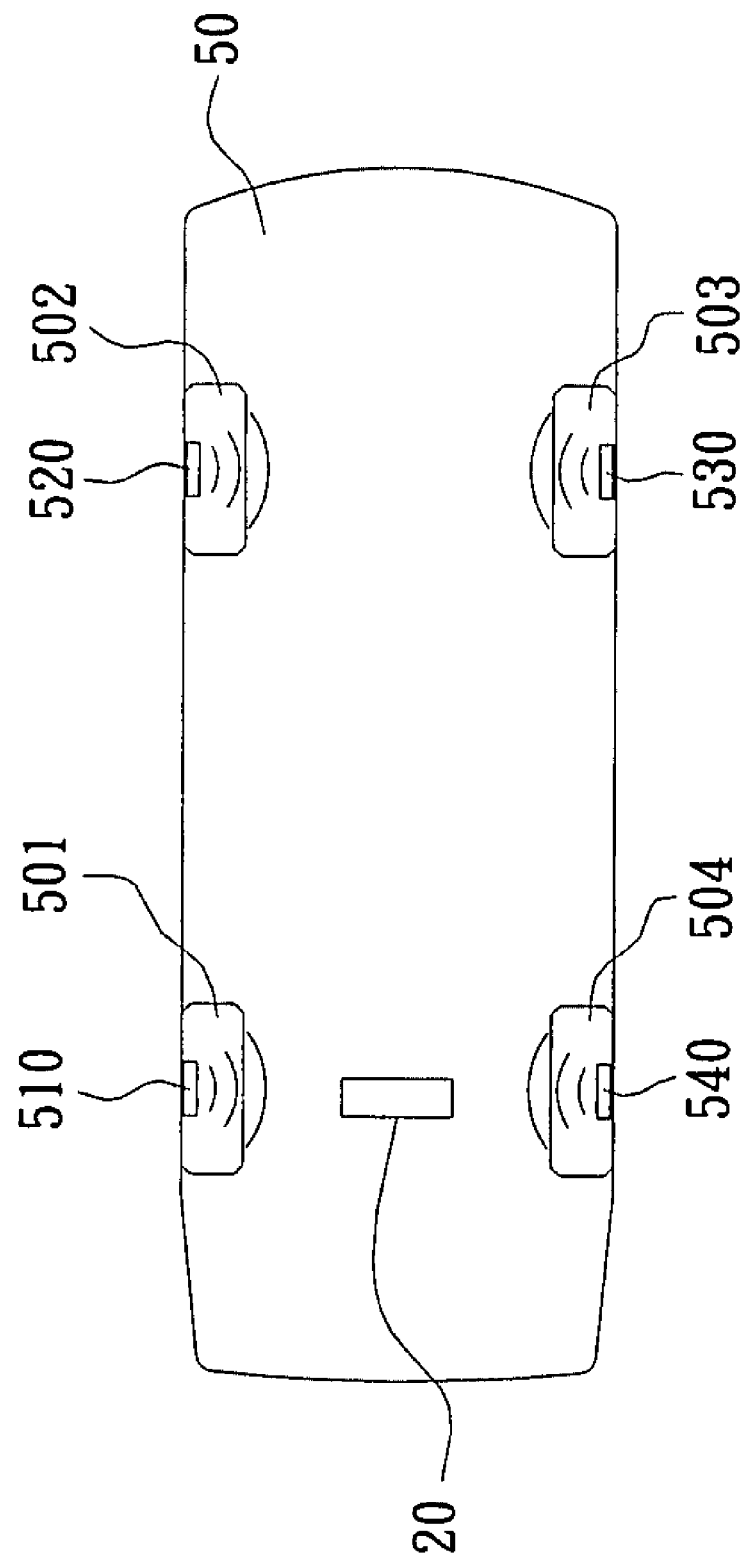
FIG. 3 is a schematic view of applying a navigation apparatus to monitor tire pressure in accordance with the present invention.

Referring to FIG. 3 for a schematic view of applying a navigation apparatus 20 to monitor tire pressure in accordance with the present invention, the navigation apparatus 20 and the tire pressure detectors 510, 520, 530, 540 constitute a tire pressure monitoring system. The tire pressure detectors 510, 520, 530, 540 are installed on the tires 501, 502, 503, 504 of the motor vehicle 50 for detecting the tire pressure and temperature of each tire, converting the detected value into a wireless tire pressure signal, and outputting the wireless tire pressure signal. The navigation apparatus 20 is connected to the tire pressure detectors 510, 520, 530, 540 via wireless transmission for receiving a wireless tire pressure signal outputted from each tire pressure detector 510, 520, 530, 540. The navigation apparatus 20 further carries out signal processing procedures of amplifying, filtering and modulating each wireless tire pressure signal to obtain a data stream, and the tire pressure and temperature data of each tire is converted by software, and then all of the aforementioned tire pressure data is generated. The navigation apparatus 20 outputs the tire pressure data to the display interface 211 for display and identifies whether or not each piece of tire pressure data is in compliance with a safety value, so as to control the generation of alarm signal in a sound form and/or light form.

Figure 4:
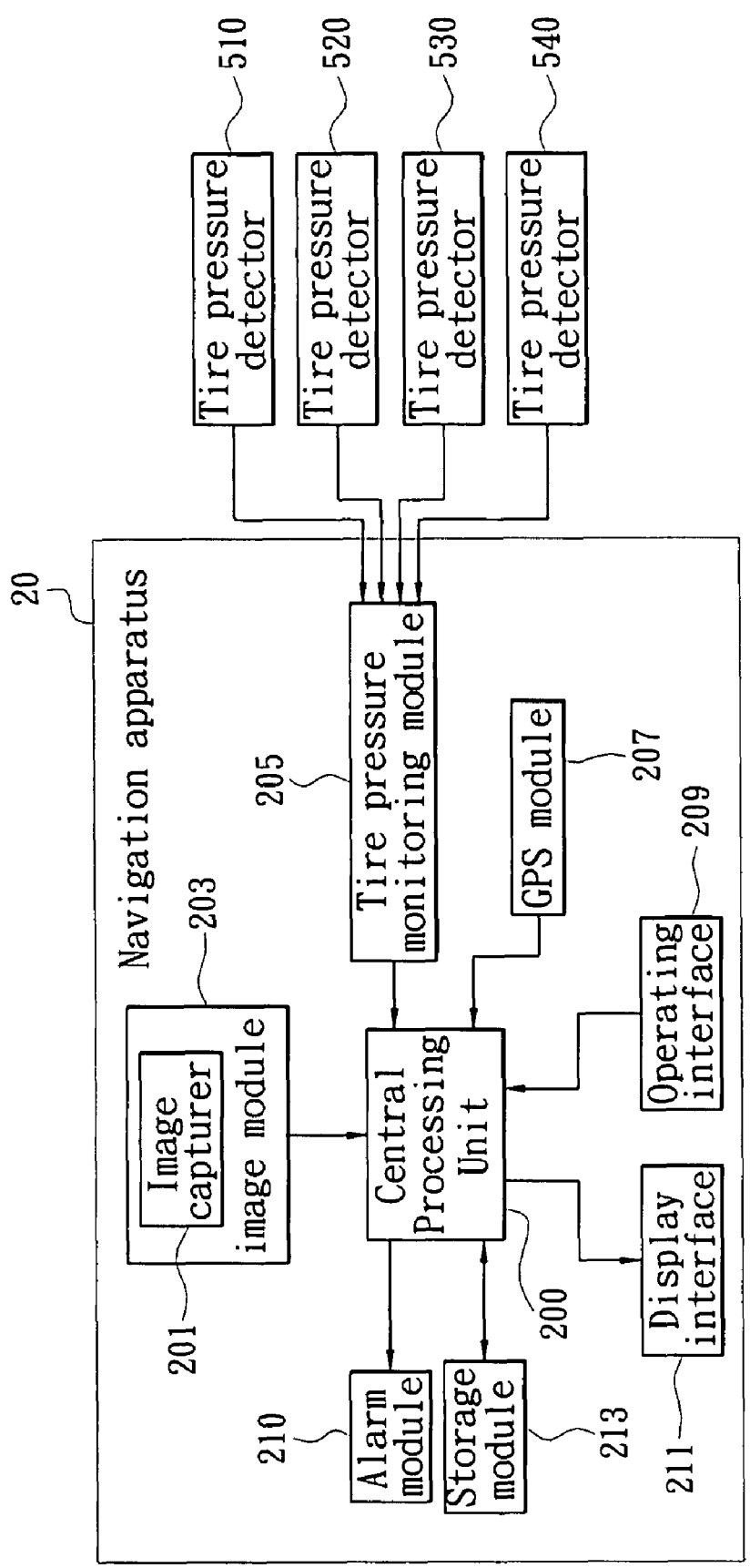
FIG. 4 is a schematic view of the system architecture of a navigation apparatus in accordance with the present invention.

Referring to FIG. 4 for a schematic view of the system architecture of a navigation apparatus 20 in accordance with the present invention, the tire pressure monitoring system 30 comprises a navigation apparatus 20 and a plurality of tire pressure detectors 510, 520, 530, 540. The navigation apparatus 20 includes a central processing unit 200, an imaging module 203 coupled to the central processing unit 200, a tire pressure monitoring module 205, a GPS module 207, an operating interface 209, a display interface 211, a storage module 213, and an alarm module 210.

The central processing unit 200 is the foundation for processing and controlling the navigation apparatus 20. The display interface 211 receives a control command from the central processing unit 200 for display. The operating interface 209 is an input device such as a touch panel, a press key module, or a keyboard for receiving a control command and outputting the control command to the central processing unit 200 for controlling the operation of the navigation apparatus 20. The storage module 213 stores software including data receiving and processing programs, navigation formula computing program and electronic map software, and also stores driving records including image data, positional data, and tire pressure data. The software such as data receiving and processing programs, navigation formula computing programs, and electronic maps are executed by the central processing unit 200.

Figure 5:
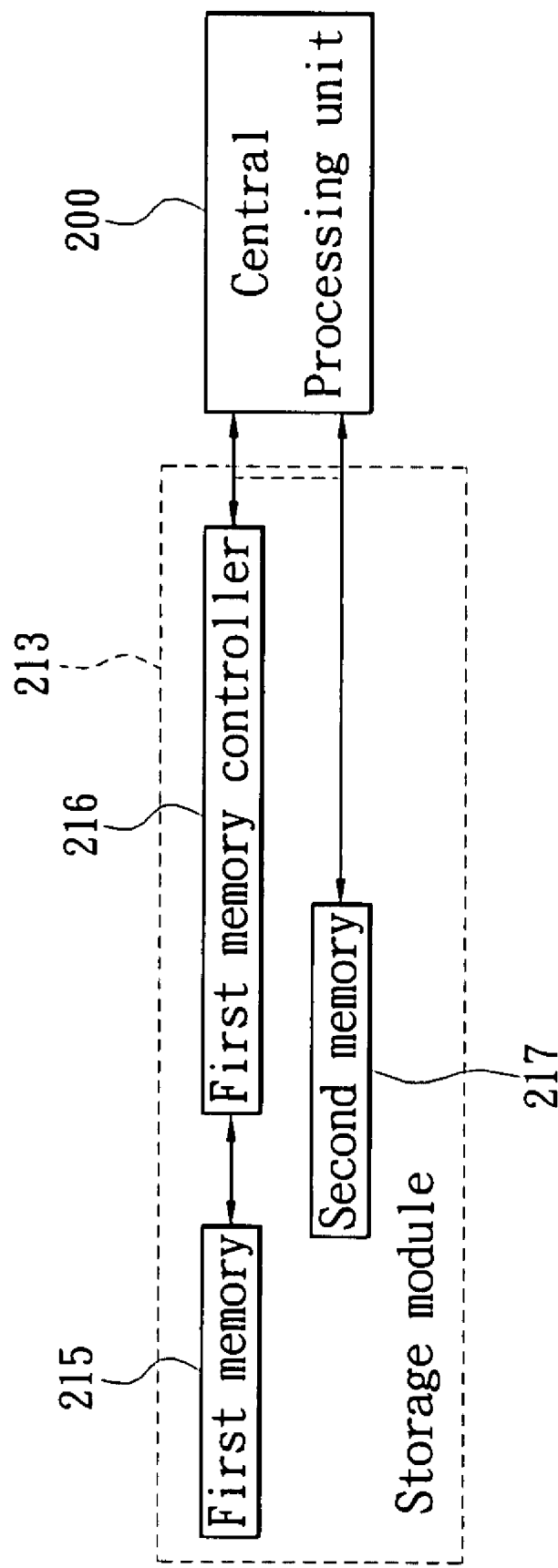
FIG. 5 is a schematic view of the system architecture of a storage module as shown in FIG. 4.

The storage module 213 includes a built-in memory for the navigation apparatus 20 and an external memory. Considering storage capacity, an external storage device with a large capacity (such as a flash memory card) is connected to the navigation apparatus 20 for storing driving records such as image data. Referring to FIG. 5 for a schematic view of the system architecture of a storage module 213 as depicted in FIG. 4, the storage module 213 includes a first memory 215, a first memory controller 216, and a second memory 217. In this preferred embodiment, the first memory 215 is an external memory such as a flash memory card or a flash memory stick for storing driving records such as image data, positional data, and tire pressure data. The first memory controller 216 is coupled to the first memory 215 for controlling and enabling the first memory 215 and accessing data. The second memory 217 is a memory built into the navigation apparatus 20 for storing software including an electronic map and a navigation program.

At present, manufacturers usually store the software including the electronic map into a flash memory card for facilitating version control and data update by users anytime. To comply with the foregoing application, the storage module 213 of another preferred embodiment further comprises a third memory and a third memory controller (not shown), wherein the third memory is an external memory of the navigation apparatus 20, and the third memory controller is provided for accessing and controlling the third memory.

The operating mechanism of the navigation apparatus 20 is described as follows. In FIG. 4, the GPS module 207 of the navigation apparatus 20 is provided for receiving satellite signals based on GPS technology, and carrying out the processes of amplifying, filtering and digitizing the received satellite signals. Next, the central processing unit 200 computes and analyzes the positional data including the longitude and latitude coordinates, and the speed and direction of the motor vehicle 50. The central processing unit 200 further executes the electronic map software to output the positional data to the display interface 211 for display, and uses the positional data for route guidance, and stores the positional data into the storage module 213 as a driving record.

The imaging module 203 includes an image capturer 201 facing the driving direction of the motor vehicle 50 for synchronously capturing image signals by the operation of the navigation apparatus 20. After the image signal captured by the image capturer 201 is amplified and filtered by the imaging module 203 into the image data including computing resources of the central processing unit 200 and compressed codes, the image data is stored into the storage module 213 as a driving record. Further, the image data is stored in a mode according to the storage capacity of the storage module 213, such storage mode being set by users. The central processing unit 200 stores the data continuously or at predetermined time intervals. When the central processing unit 200 compresses and codes the image signal, the positional data is added to the image data for storage, such that when the storage module 213 reads the image data, the positional data will be provided at the same time, so as to give a more detailed driving record.

The tire pressure detectors 510, 520, 530, 540 are installed to the tires respectively for detecting the tire pressure and temperature, converting the detected tire pressure and temperature into wireless tire pressure data signals, and outputting the signals. Each tire pressure detector 510, 520, 530, 540 has a separate identification code. The tire pressure monitoring module 205 includes a signal receiver connected to each tire pressure detector 510, 520, 530, 540 by the near field wireless communication technology for receiving a wireless tire pressure signal outputted from each tire pressure detector 510, 520, 530, 540. The tire pressure monitoring module 205 processes the received wireless tire pressure signal into a digital tire pressure signal, transmits the digital tire pressure signal to the central processing unit 200, and uses the source of the identification data to convert the tire pressure and temperature of each tire into tire pressure data. Next, the tire pressure data of each tire is transmitted to the display interface 211 for display or stored in the storage module 213. The central processing unit 200 timely identifies whether or not the tire pressure data is in compliance with a safety value for controlling the alarm module 210 to generate an alarm signal.

The alarm module 210 includes a buzzer and/or a light emitting device for receiving a control command from the central processing unit 200 to generate an alarm signal in a form of sound and/or light.

The tire pressure detectors 510~540 are connected to the tire pressure monitoring module 205 via wireless transmission, and the related detection, conversion, and signal transmission technologies are prior arts, and thus will not be described here.

Figure 6:
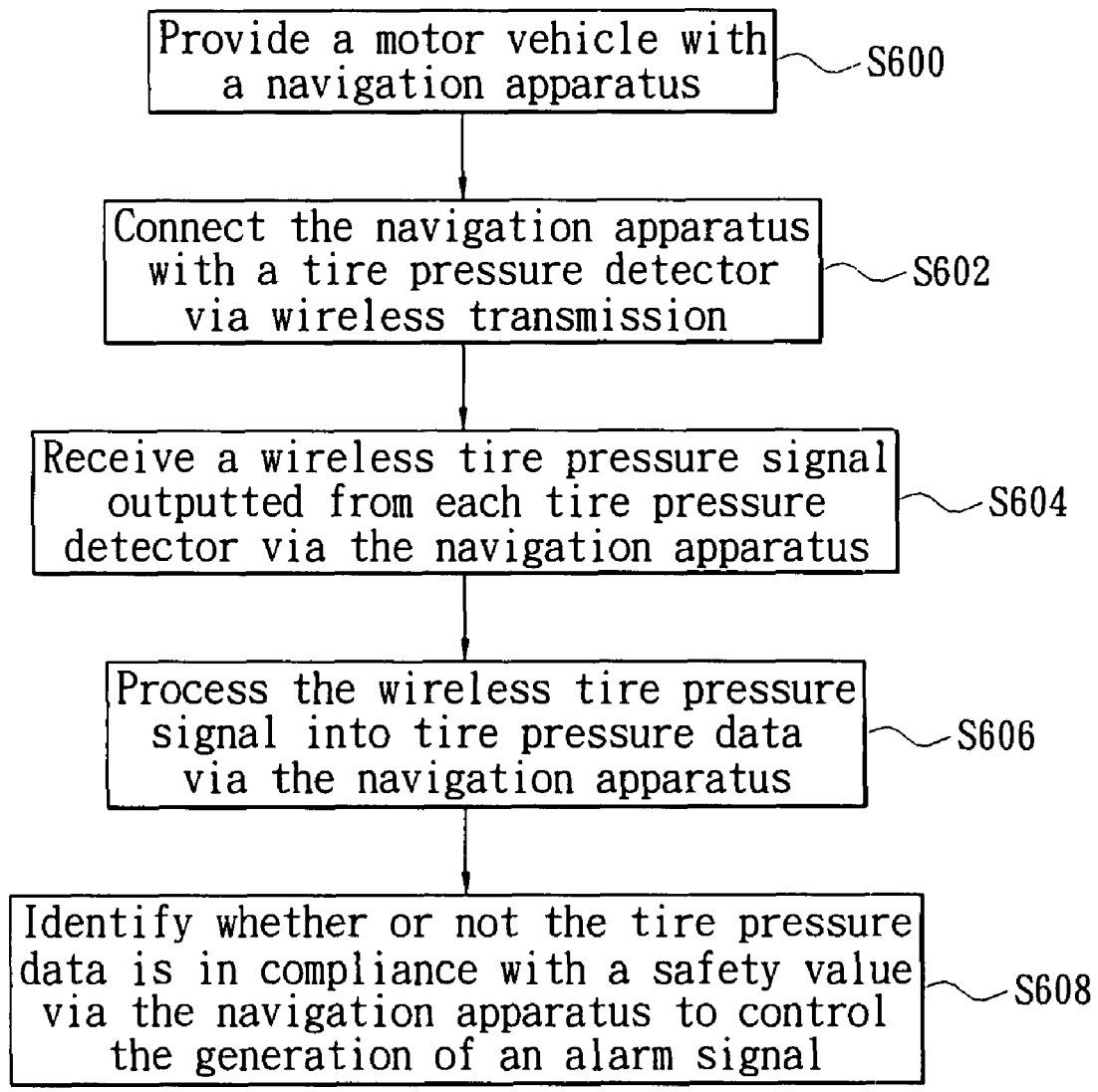
FIG. 6 is a flow chart of a method for monitoring vehicle safety by a navigation apparatus in accordance with the present invention.

Referring to FIG. 6 for a flow chart of a method for monitoring vehicle safety by a navigation apparatus in accordance with the present invention, the method is applied in a motor vehicle having a plurality of tires, and the related system architecture is shown in FIGS. 3 and 4. The method as shown in FIG. 6 comprises the steps of:

Firstly, providing a motor vehicle 50 with a navigation apparatus 20, the navigation apparatus using GPS technology to generate positional data for route guidance (Step S600);

Secondly, connecting the navigation apparatus 20 with a plurality of tire pressure detectors 510, 520, 530, 540 via wireless transmission, wherein the tire pressure detectors 510, 520, 530, 540 are installed on the tires 501, 502, 503, 504 of the motor vehicle 50 respectively (Step S602);

receiving a wireless tire pressure signal outputted from each tire pressure detector 510, 520, 530, 540 by a tire pressure monitoring module 205 of the navigation apparatus 20 (Step S604);

processing the wireless tire pressure signal into tire pressure data by a central processing unit 200 of the navigation apparatus 20 (Step S606); and finally, identifying whether or not the tire pressure data is in compliance with a safety value by the central processing unit 200 of the navigation apparatus 20 (Step S608).

Therefore, the driver can be informed about the current condition of each tire, so as to help prevent accidents or flat tires.

In a preferred embodiment of the invention, the method for monitoring vehicle safety further comprises the step of controlling a display interface 211 to display the tire pressure data by the central processing unit 200 of the navigation apparatus 20 after the Step (S608).

In a preferred embodiment of the present invention, the navigation apparatus 20 includes an image capturer 201. In Step S600, the navigation apparatus 20 is affixed in the motor vehicle 50, so that the image capturer 201 faces the driving direction of the motor vehicle 50. The method for monitoring vehicle safety further comprises the steps of:

firstly, capturing an image signal by the image capturer 201;

secondly, processing the image signal into image data via the navigation apparatus 20; and finally, transmitting the image data to a storage module 213 via the navigation apparatus 20 for storage.

In a preferred embodiment, after the central processing unit 200 of the navigation apparatus 20 adds the positional data into the image data, the image data is transmitted to and stored into the storage module 213.

In summation of the description above, the navigation apparatus and method for monitoring vehicle safety provide a navigation apparatus concurrently having image recording and tire pressure monitoring functions as route guidance for the driver of a motor vehicle. The safety functions of the navigation apparatus enhance driving safety.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A portable navigation apparatus for a vehicle, comprising:
   an imaging module, for capturing an image signal;
   a global positioning system (GPS) module, for generating positional data;
   a tire pressure monitoring module, for receiving a wireless tire pressure signal of the vehicle wherein the tire pressure monitoring module processes the wireless tire pressure signal into a digital tire pressure signal;
   a storage module, for storing electronic map software;
   a display interface;
   a central processing unit, coupled to the imaging module, the GPS module, the tire pressure monitoring module, the storage module, and the display interface;
   wherein the central processing unit is provided for receiving the image signal, generating image data, and transmitting the image data to the storage module for storage; and a casing within which the imaging module, the GPS module, the tire pressure monitoring module, a storage module, the display interface, and the central processing unit are disposed;
   wherein the central processing unit is provided for executing the electronic map software, and receiving the positional data as a route guidance; wherein the central processing unit is provided for processing the digital tire pressure signal into tire pressure data, and determining whether or not the tire pressure data is in compliance with a predetermined safety value; and wherein the central processing unit controls the display interface to display the tire pressure data.

2. The navigation apparatus of claim 1, wherein the wireless tire pressure signal is outputted by a tire pressure detector.

3. The navigation apparatus of claim 1, wherein the central processing unit adds the positional data to the image data, and transmits the data to the storage module for storage.

4. The navigation apparatus of claim 1, further comprising an operating interface coupled to the central processing unit for inputting a control command to the central processing unit.

5. The navigation apparatus of claim 1, further comprising an alarm module coupled to the central processing unit for receiving an alarm signal controlled and generated by the central processing unit.

6. The navigation apparatus of claim 1, wherein the storage module includes a first memory and a second memory, and the first memory and the second memory are an external memory and a built-in memory of the navigation apparatus respectively.

7. The navigation apparatus of claim 6, wherein the storage module includes a first memory controller coupled between the central processing unit and the first memory for controlling a data access of the first memory.

8. The navigation apparatus of claim 6, wherein the first memory is a flash memory card.

9. The navigation apparatus of claim 1, wherein the imaging module includes an image capturing device for capturing the image signal.

10. The navigation apparatus of claim 9, wherein the image capturing device and the display interface are disposed on two corresponding surfaces of the casing, respectively.

11. A method for monitoring vehicle safety, applied in a motor vehicle having a plurality of tires, and the method comprising the steps of:
    providing the motor vehicle with a portable navigation apparatus comprising a casing within which the imaging module, the GPS module for generating positional data as route guidance, a tire pressure monitoring module, a storage module, a display interface, and a central processing unit are disposed;
    connecting the tire pressure monitoring module with a plurality of tire pressure detectors via a wireless method, wherein the tire pressure detectors are installed on the tires;
    receiving a wireless tire pressure signal outputted from each tire pressure detector via the tire pressure monitoring module;
    processing the wireless tire pressure signal into tire pressure data via the central processing unit;
    controlling the display interface to display the tire pressure data; and
    determining whether or not the tire pressure data is in compliance with a predetermined safety value via the central processing unit, for controlling a generation of an alarm signal.

12. The method for monitoring vehicle safety of claim 11, wherein the navigation apparatus includes an image capturing device, and the method further comprises using the image capturing device to capture an image signal, a processing the image signal into image data via the navigation apparatus, a and transmitting and storing the image data into a storage module via the navigation apparatus.

13. The method for monitoring vehicle safety of claim 12, wherein in the step of providing the motor vehicle with a navigation apparatus, the navigation apparatus is fixed in the motor vehicle, so that the image capturing device faces a driving direction of the motor vehicle.

14. The method for monitoring vehicle safety of claim 12, further comprising adding the positional data to the image data via the navigation apparatus, and storing the image data on the storage module.

* * * * *